US005896266A

United States Patent [19]

Rubinski

[11] Patent Number: 5,896,266

[45] Date of Patent: Apr. 20, 1999

[54] OVERVOLTAGE SUPPRESSOR HAVING INSULATING HOUSING

[75] Inventor: Andreas Rubinski, Neuenhof, Switzerland

[73] Assignee: Asea Brown Boveri AG, Baden, Switzerland

[21] Appl. No.: 08/965,866

[22] Filed: Nov. 7, 1997

[30] Foreign Application Priority Data

Dec. 6, 1996 [DE] Germany ........................ 196 50 579

[51] Int. Cl.$^6$ ........................ H02H 1/00

[52] U.S. Cl. ........................ 361/127; 361/117

[58] Field of Search ........................ 361/117, 118, 361/120, 121, 127, 128

[56] References Cited

U.S. PATENT DOCUMENTS

| | | | |
|---|---|---|---|
| 4,467,387 | 8/1984 | Bergh et al. . | |
| 4,528,304 | 7/1985 | Yoshimura et al. | 523/216 |
| 4,686,603 | 8/1987 | Mosele | 361/118 |
| 4,899,248 | 2/1990 | Raudabaugh | 361/127 |
| 4,992,906 | 2/1991 | Doone et al. . | |
| 5,043,838 | 8/1991 | Sakich | 361/117 |
| 5,214,249 | 5/1993 | Goch et al. | 174/179 |
| 5,291,366 | 3/1994 | Giese et al. . | |
| 5,363,266 | 11/1994 | Wiseman et al. | 361/127 |

FOREIGN PATENT DOCUMENTS

| | | |
|---|---|---|
| 0103454 | 3/1984 | European Pat. Off. . |
| 0335479A2 | 10/1989 | European Pat. Off. . |
| 0335479B1 | 10/1989 | European Pat. Off. . |
| 0642141A1 | 3/1995 | European Pat. Off. . |
| 1170046 | 5/1964 | Germany . |

*Primary Examiner*—Jeffrey Gaffin
*Assistant Examiner*—Kim Huynh
*Attorney, Agent, or Firm*—Burns, Doane, Swecker & Mathis, L.L.P.

[57] ABSTRACT

The overvoltage suppressor has a cylindrical active part, which is arranged between two electrically conductive, cylindrical fittings and contains at least one varistor on a metal-oxide base, as well as an insulating material housing which surrounds the active part and is closed at the ends by the fittings. The insulating material housing is filled with an insulating material which surrounds the active part on the outside and is formed by an injection-molded or extruded insulating material tube and by a shielded weather protection which is held on the outer surface of the tube. A first of the two fittings is integrally formed into the tube at a first of its two ends. An external thread on the second fitting is screwed into an internal thread in the tube, forming a contact force. Such an overvoltage suppressor can be manufactured in a simple and cost-effective manner using method steps which can easily be automated, and is nevertheless distinguished by high mechanical strength and good electrical characteristics.

18 Claims, 2 Drawing Sheets

Fig. 1
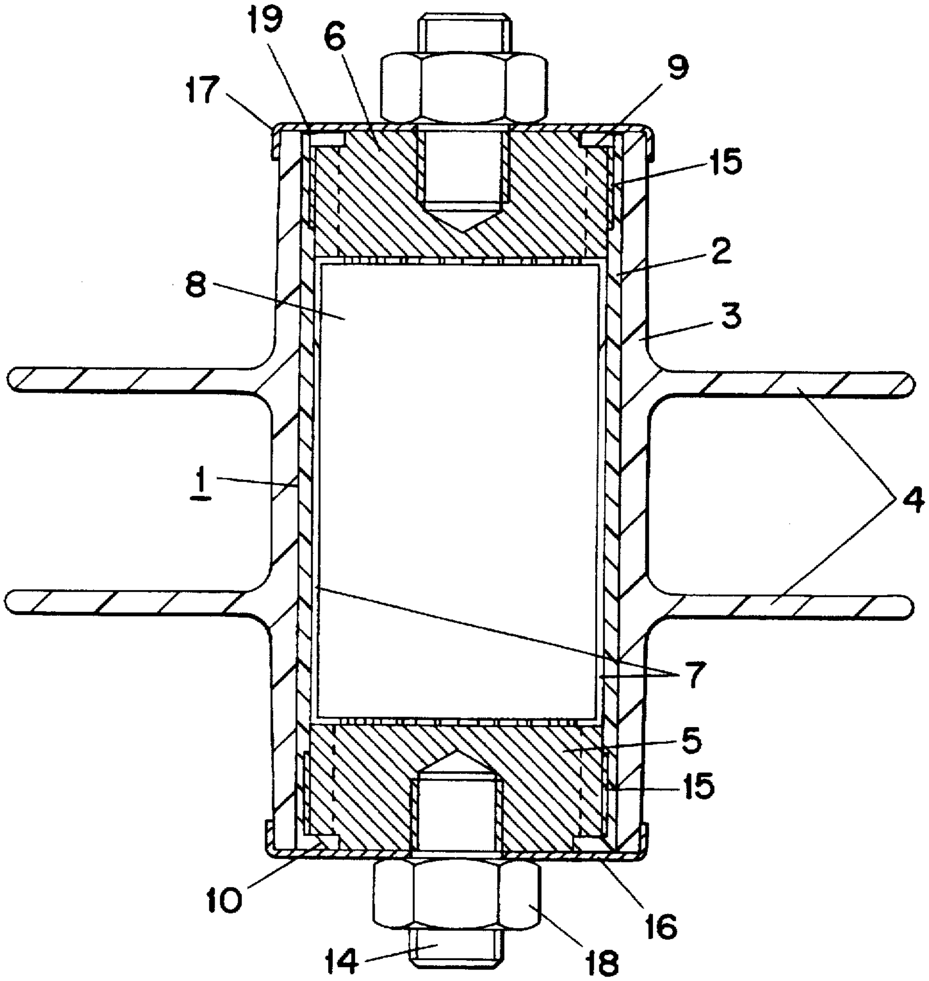
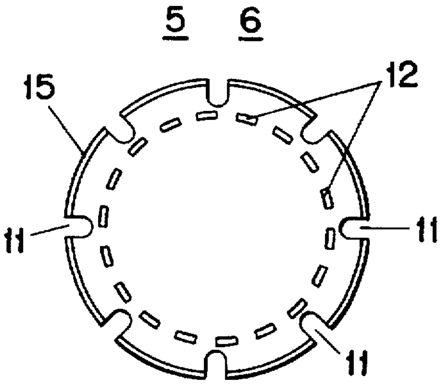
Fig. 2
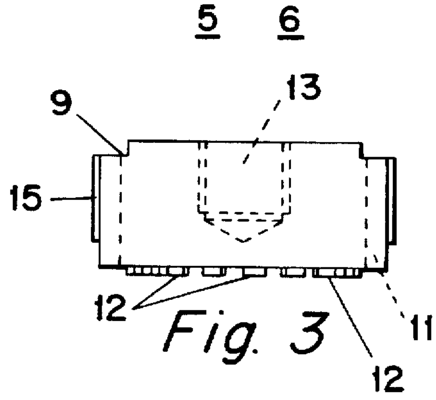
Fig. 3

OVERVOLTAGE SUPPRESSOR HAVING INSULATING HOUSING

BACKGROUND OF THE INVENTION

1. Field of the Invention

The invention relates to an overvoltage suppressor having an insulating housing.

Such an overvoltage suppressor is used in medium- or high-voltage systems for measurement, protection or control tasks and has an active part which is arranged in an insulating material housing and contains at least one varistor based on zinc oxide which has been deliberately doped with selected elements such as Bi, Sb, Co and Mn. The active part is fixed in the housing interior by means of a layer of insulating material.

2. Discussion of Background

An overvoltage suppressor of the type mentioned initially is specified in EP 0 103 454 B1. This overvoltage suppressor comprises a porcelain housing which is provided with weather shields and has a cylindrical hole into which a cylindrical active part is inserted, based on a plurality of varistors that are stacked in the form of a column and are based on doped zinc oxide. The active part is fixed on the glass base by an adhesive layer which is provided between the wall of the hole and the outer surface of the active part. Two metal fittings which are attached to the end surfaces of the active part close the housing interior on the outside and are used as electrical connections. During manufacture of this overvoltage suppressor, the porcelain housing is subjected to high temperatures, since liquid glass is poured into the porcelain housing to form the adhesive layer. In addition, it is necessary to fit the fittings to the ends of the porcelain housing using a cement.

A further overvoltage suppressor having a cylindrical active part and based on metal-oxide varistors is disclosed in EP 0 335 479 B1. This overvoltage suppressor has, as a housing, an insulating material tube which is wound from threads and is closed by two metal fittings, and elastomer weather protection which is held on the outer surface of the insulating material tube. During manufacture of this overvoltage suppressor, the insulating material tube is formed by winding the active part which contains the two fittings and the varistors.

SUMMARY OF THE INVENTION

Accordingly, one object of the present invention is to provide a novel overvoltage suppressor of the type mentioned initially, which is distinguished by high mechanical strength and can nevertheless be manufactured in a simple and cost-effective manner.

The overvoltage suppressor according to the invention is distinguished by the fact that it can be manufactured quickly and in an extremely cost-effective manner using a small number of method steps that are easy to carry out, and nevertheless has excellent mechanical and electrical characteristics. This is primarily a result of the fact that it is easy to automate the essential method steps. Typical method steps are the manufacture of a thermoplastic tube and an elastomer tube, as well as inserting the parts (which are matched to one another) into one another and screwing them together to form the suppressor housing that accommodates the active part, as well as the filling of the suppressor housing with a liquid which forms an insulating material and which can preferably be cured at room temperature. Suitable selection of the thermoplastic material and of the elastomer material allows the mechanical strength and the dielectric behavior of the overvoltage suppressor to be optimized.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 shows a view of a first exemplary embodiment of the overvoltage suppressor according to the invention, sectioned in the axial direction and having a cylindrical active part which is located in an insulating material housing and is arranged between two cylindrical fittings, FIG. 2 shows a plan view of the end of one of the two fittings, facing the active part of the over-voltage suppressor according to FIG. 1, FIG. 3 shows a side view of the fitting according to FIG. 2.

DESCRIPTION OF THE PREFERRED EMBODIMENTS

Figure 4:
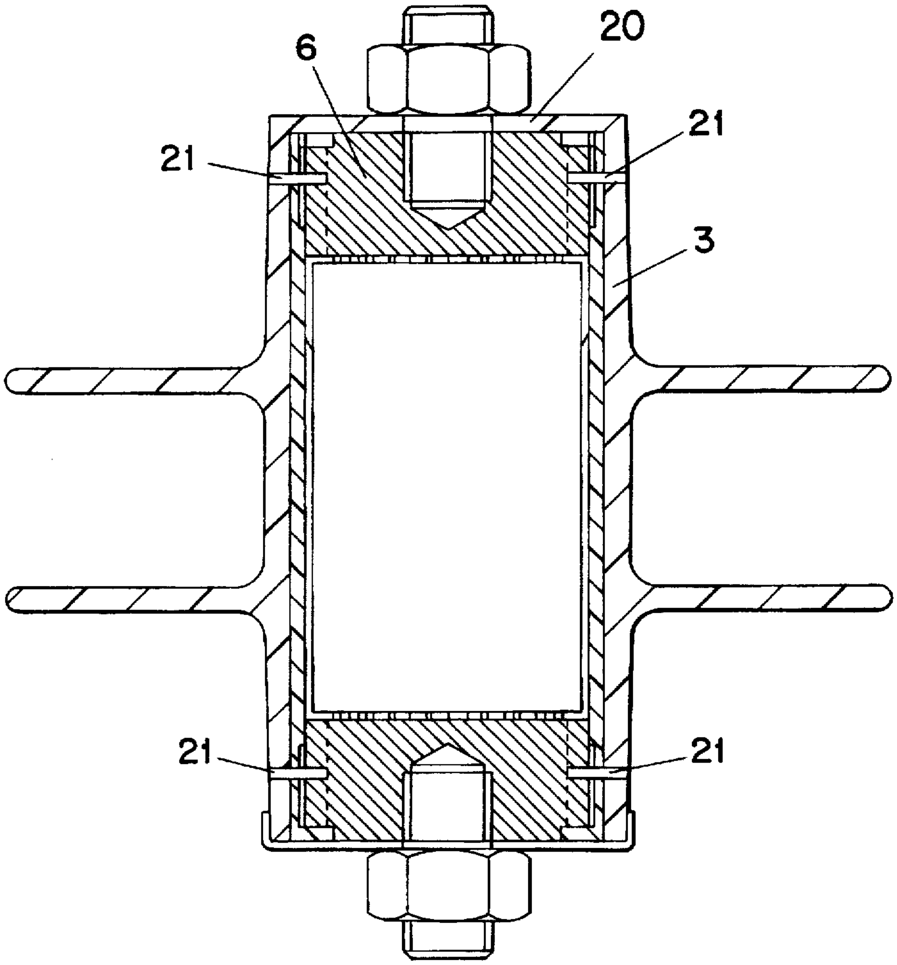
FIG. 4 shows a view of a second exemplary embodiment of the overvoltage suppressor according to the invention, sectioned in the axial direction.

Referring now to the drawings, wherein like reference numerals designate identical or corresponding parts throughout the several views, the overvoltage suppressor illustrated in FIG. 1 has a two-piece insulating material housing 1 which is formed by an insulating material tube 2 and shielded weather protection 3 which is pushed onto the outer surface of the tube 2 with the aid of a grease layer, in a watertight manner. The insulating material tube 2 predominantly contains a thermoplastic polymer, preferably such as a polyamide, and filler embedded in the thermoplastic, preferably glass fibers with a proportion of 20–60, for example 30 or 50% by weight, of the insulating material tube. Such a tube can be manufactured in a particularly simple and cost-effective manner by extrusion or injection molding.

The weather protection 3 is formed by an elastomer polymer, preferably based on an ethylene, propylene, silicone, fluorosilicone or fluoro rubber, and is advantageously manufactured by injection molding. It is particularly advantageous in this case if the shields 4 of the weather protection 3 run radially. The mold which is required for casting the weather protection 3 may then be designed such that the unavoidable casting seam forms the outer edge of the shields 4 and runs between the shields, but not in those regions, which are dielectrically the most severely loaded, above the top shield 4 and below the bottom shield 4.

The grease provided between the insulating material tube 2 and the weather protection 3 is preferably a silicone grease. This grease seals the insulating material tube 2 and the weather protection 3 from one another, preventing the ingress of moisture between the insulating material tube 2 and the weather protection 3. At the same time, the grease makes it easier to push the weather protection 3 onto the insulating material tube 2 during assembly of the overvoltage suppressor and, in addition, also improves the dielectric characteristics of the insulating material housing 1.

If the insulating material tube 2 is manufactured by injection molding or extrusion, a cylindrical fitting 5 which closes the lower end of the tube 2 is formed into the tube 2 from a material which conducts electricity well, such as alloyed or unalloyed aluminum or copper. A correspondingly designed fitting 6 made of the same material closes the insulating material tube 2 at the top.

Figure 5:
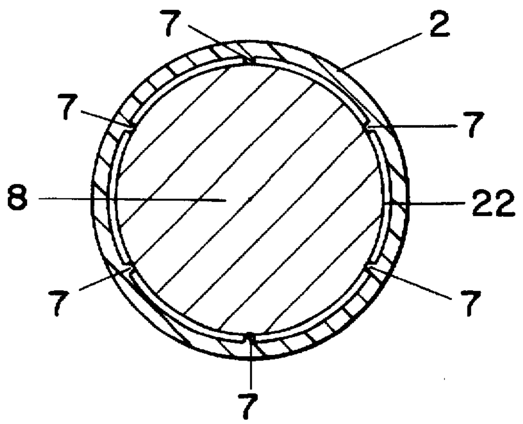
FIG. 5 shows a cross-sectional view along line 5—5 in FIG. 1.

During manufacture of the insulating material tube 2, at least three guide rails 7 (see FIG. 5), which point in the direction of the tube axis, are at the same time formed into the inside of the tube 2. The guide rails 7 are arranged distributed uniformly in the circumferential direction of the insulating material tube 2 and thus provide a space between the inner wall of the insulating material tube 2 and the outer surface of a cylindrical active part 8 located in the interior of the insulating material tube. This active part 8 contains a varistor which is designed in the form of a column and is on a metal-oxide base, or a plurality of varistors 8, which are designed in the form of discs and are arranged in the form of a column with contact discs located in between, these varistors respectively being on a metal-oxide base. The hollow-cylindrical space between the active part 8 and the insulating material tube 2 is filled with insulating material 22 (see FIG. 5) in order to improve the dielectric behavior of the overvoltage suppressor. This insulating material 22 is advantageously formed from a resin which cures at room temperature and is based on silicone, with which the interior of the insulating material housing 1 is filled, during assembly of the overvoltage suppressor, initially in the form of a liquid.

FIG. 1 shows that the fittings 5, 6 each have an annular indentation which is formed into an outward-pointing end surface and is located on the outer surface. This indentation is designated by the number 9 in FIG. 3. The indentation in the fitting 5 which closes the lower end of the insulating material tube 2 is used to accommodate a collar 10 of the tube, which collar 10 points radially inward and is formed during manufacture of the tube 2. The collar 10 engages behind the fitting 5 and thus closes through-openings 11 which are formed into the indentation 9 and point in the direction of the tube axis. The indentation in the fitting 6 is used to accommodate insulating material 22 which emerges from the tube 2 after the insulating material housing 1 has been filled with the initially liquid insulating agent, and is then cured at room temperature to form the insulating material.

On their two inward-pointing end surfaces, the two fittings 5, 6 each have a plurality of contact studs 12, while an internal thread 13 is incorporated on each of the two outward-pointing ends of fitings 5, 6, which thread 13 is used to accommodate a threaded bolt 14 in order to produce a direct electrical connection to an electrical connecting conductor (FIG. 1). An external thread 15 is incorporated in the outer surfaces of each of the two fittings 5 and 6. The external thread 15 on the fitting 5 holds fitting 5, which is integrally formed on and joined to the tube 2, in a fixed position in the insulating material tube 2 when any axial force is exerted, while, in contrast, the external thread 15 on the fitting 6 interacts with an internal thread, (not labeled) which is formed into the upper end of the tube 2, to form an axially acting force.

Metal covers 16 and 17, which are arranged at the lower end of the insulating material housing 1, are pressed against the housing 1 by means of two nuts 18 that are carried on the threaded bolts 14 and thus prevent undesirable moisture entering the interior of the overvoltage suppressor.

This overvoltage suppressor, with the active part 8, the insulating material tube 2, the weather protection 3, the two fittings 5 and 6, the insulating material 22 between the active part 8 and the insulating material tube 2 and the two covers 16 and 17, has eight parts which are easy to assemble, two of which in each case, namely the fittings 5, 6 and the covers 16, 17, are of identical design. The overvoltage suppressor can thus be manufactured quickly and using a method which is particularly suitable for large-scale production.

Such a method is advantageously carried out as follows:

The active part 8 is pushed into the insulating material tube 2, which already contains the lower fitting 5 and is thus shaped like a cup, and the upper end of the tube 2 is then closed by screwing in the fitting 6. A tool can be used to engage in the through-openings 11 for the screwing-in process. The fitting 6 is screwed into the tube interior until the contact studs 12 on the two fittings 5 and 6 press with sufficient contact force against the two end surfaces of the active part 8. Since the tube 2 has relatively good elasticity, this ensures that this contact force is maintained during operation of the overvoltage suppressor.

An injection needle, for example, is then used to introduce liquid insulating agent through the through-openings 11 provided in the upper fitting 6 into the hollow-cylindrical space between the active part 8 and the insulating material tube 2, this space being supported by the guide rails 7. Since the through-openings 11 that are provided in the lower fitting 5 are closed by the collar 10, the insulating agent cannot escape at the bottom. Any liquid insulating agent which emerges from the through-openings 11 in the upper fitting 6 during curing is collected in the indentation 9 in the fitting 6 and, once the curing process has been completed, likewise forms a collar which seals the housing interior. The housing interior is further additionally sealed by the covers 16 and 17, which project over the ends of the weather protection 3.

In general, the two covers 16, 17 are made of metal, such as steel, aluminum or an aluminum alloy. However, in one preferred embodiment of the invention, at least the cover 17 is made of a material which can be welded, soldered or bonded in a simple, force-fitting manner to the insulating material tube 2, forming a connecting point 19. A particularly firm mechanical joint is achieved if the cover 17 is made of the same material as the insulating material tube 2, and if the joint is achieved by welding the upper edge of the insulating material tube 2 and the cover 17, in particular by ultrasound. An overvoltage suppressor manufactured in such a way is distinguished by high mechanical strength since any tensile forces produced by the active part 8, in particular when loaded with a current pulse, are now transmitted from the fitting 6 to the insulating material tube 2 not only via the external thread 15 but also via the connecting point 19. In addition, the connection of the two parts 2 and 17 makes it even harder for water to enter the housing interior.

In the embodiment according to FIG. 4, the weather protection 3 is closed at its upper end and has a cover part 20 which makes the cover 17 superfluous. Furthermore, in this embodiment, pins 21 which are passed through the weather protection 3 and the insulating material tube 2 into the fittings 5, 6 very considerably increase the mechanical strength of the casing of the active part 8 formed by the insulating material tube 2, the weather protection 3 and the fittings 5, 6, particularly with regard to tensile loads. In order to ensure that forces are transmitted uniformly, it is recommended that the pins be distributed uniformly in the circumferential direction. Even three pins per fitting considerably increase the mechanical strength. Alternatively, more than three pins may be used, depending on the diameter of the insulating material tube 2.

The pins 21 mean that the mechanical strength of the overvoltage suppressor according to the exemplary embodiment described above can be further additionally improved.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An overvoltage suppressor comprising:

a cylindrical active part comprising at least one varistor on a metal-oxide base and having two opposite ends;

two electrically conductive cylindrical fittings, said active part being positioned between said two fittings;

an insulating material housing surrounding said active part, said fittings positioned on opposite ends of said active part and closing said housing, said housing being radially spaced from said active part to form a space therebetween, said space being filled with an insulating material which surrounds said active part on the outside of said active part;

wherein said insulating material housing comprises an injection-molded or extruded insulating material tube having two end, one of said tube ends including an internal thread, said insulating material housing further comprising a shielded weather protection which is held on the outer surface of said tube;

wherein a first of said two fittings is formed into said tube at a first of said two ends; and wherein a second of said two fittings comprises an external thread on, said second fitting being screwed into said internal thread in said tube to form a contact force.

2. The overvoltage suppressor as claimed in claim 1, wherein said tube is formed from a fiber-reinforced polymer.

3. The overvoltage suppressor as claimed in claim 2, wherein said thermoplastic is a polyamide containing between about 20% and about 60% by weight of glass fiber.

4. The overvoltage suppressor as claimed in claim 3, wherein polyamide contains between about 30% and about 50% by weight of glass fiber.

5. The overvoltage suppressor as claimed in claim 1, wherein said two fittings each have an outward-pointing end surface which faces away from said active part and includes an outer periphery, each of said two fittings further comprising an annular indentation formed into said outward-pointing end surface and positioned on said outer periphery.

6. The overvoltage suppressor as claimed in claim 5, wherein said tube further comprises a radially inwardly directed collar, said indentation in said first fitting holding said collar.

7. The overvoltage suppressor as claimed in claim 5, wherein said tube comprises a tube axis, and further comprising at least one through-opening formed into said indentation parallel to the direction of said tube axis.

8. The overvoltage suppressor as claimed in claim 7, further comprising an insulating material formed by the curing of a liquid insulating agent, said liquid insulating agent predominantly having been passed through said at least one through-opening into said indentation from the interior of said housing, wherein said indentation in said second fitting holds said insulating material.

9. The overvoltage suppressor as claimed in claim 1, wherein said two fittings each comprise an inward-pointing end surface and contact studs, said contact studs being seated on said opposite ends of said active part.

10. The overvoltage suppressor as claimed in claim 1, wherein said shielded weather protection includes at least one radially running shield.

11. The overvoltage suppressor as claimed in claim 1, further comprising two covers and said shielded weather protection having two ends, and wherein said two ends of said insulating material housing are closed by said two covers which project over said ends of said shielded weather protection.

12. The overvoltage suppressor as claimed in claim 11, further comprising at least one connecting point, and wherein one of said two covers is connected to said second fitting by said at least one connecting point.

13. The overvoltage suppressor as claimed in claim 12, wherein said at least one connecting point is formed by welding.

14. The overvoltage suppressor as claimed in claim 1, further comprising a cover part which is integrated into said shielded weather protection, and wherein one of said two ends of said insulating material housing closed by said cover part.

15. The overvoltage suppressor was claimed in claim 1, further comprising at least one pin which extends through said insulating material tube and into at least one of said two fittings, wherein said at least one of said two fittings is fixed by said at least one pin.

16. The overvoltage suppressor as claimed in claim 2, wherein said fiber-reinforced polymer comprises a fiber-reinforced thermoplastic.

17. The overvoltage suppressor as claimed in claim 1, wherein said tube comprises a tube axis and an inside, and further comprising at least three guide rails aligned with said tube axis and formed into said inside of said tube.

18. The overvoltage suppressor as claimed in claim 13, wherein said welding is selected from the group consisting of ultrasound welding, soldering, or bonding.

* * * * *